No. 766,384. PATENTED AUG. 2, 1904.
F. H. RICHARDS.
SAW DETACHING MECHANISM.
APPLICATION FILED OCT. 2, 1903.
NO MODEL. 3 SHEETS—SHEET 1.
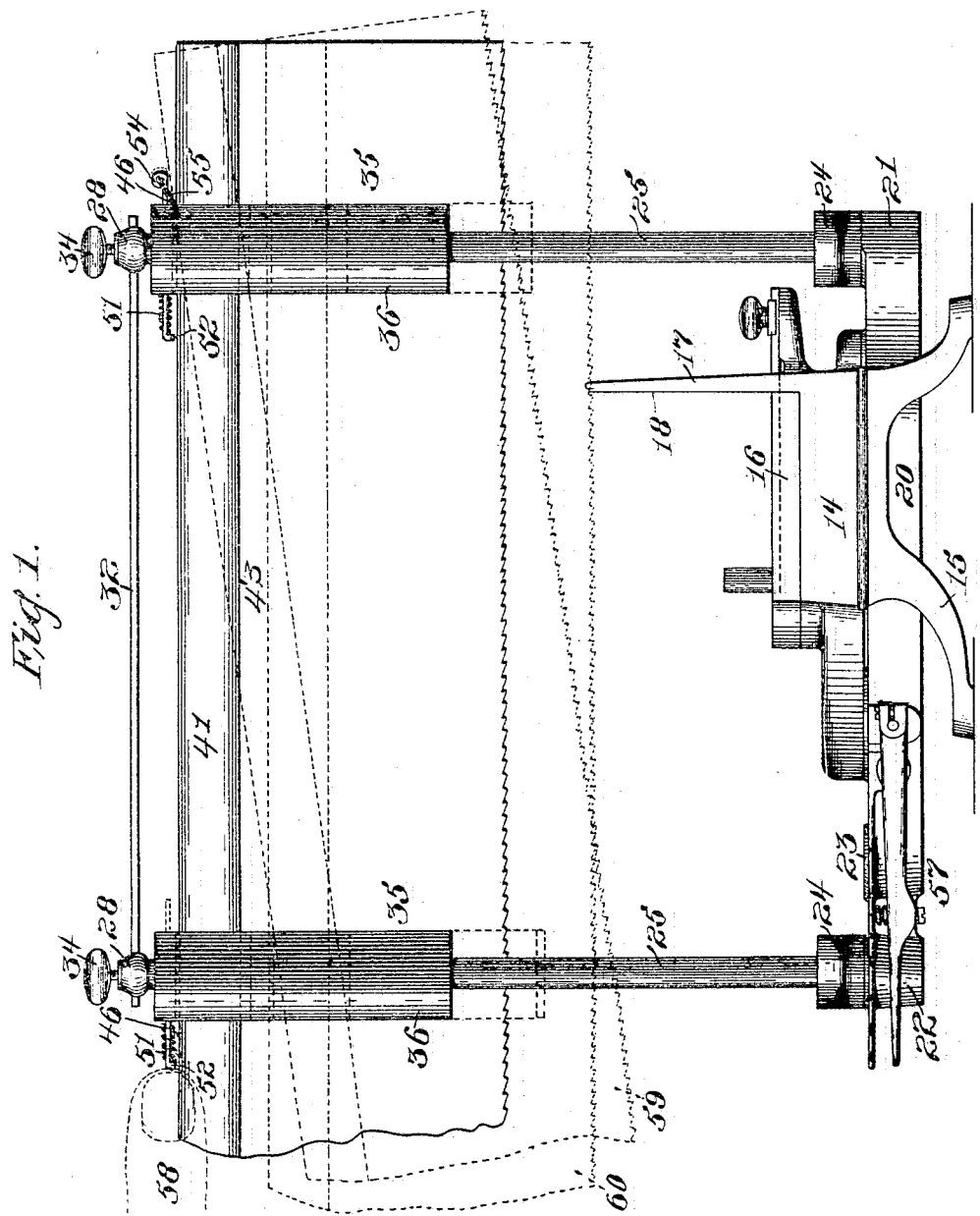
Witnesses:
Calderon G Fuss.
C. A. Jarvis.
Inventor:
F.H.Richards.

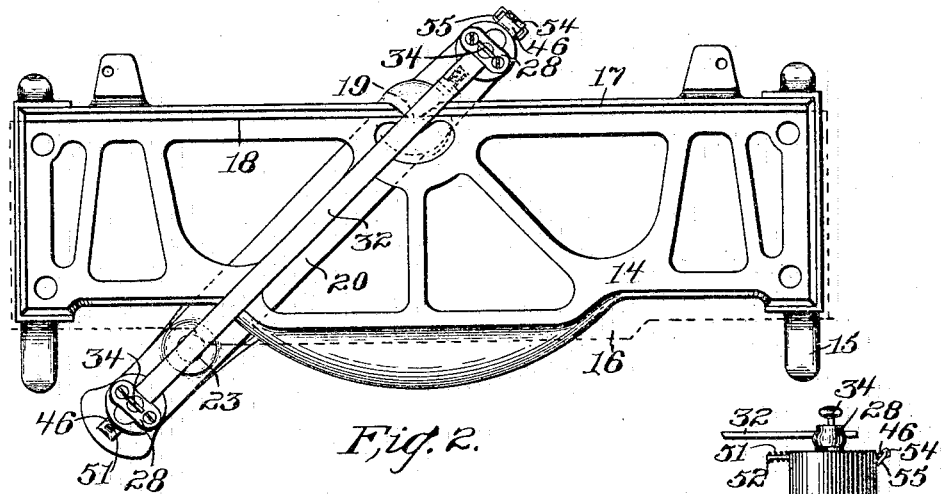
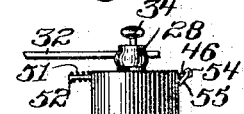
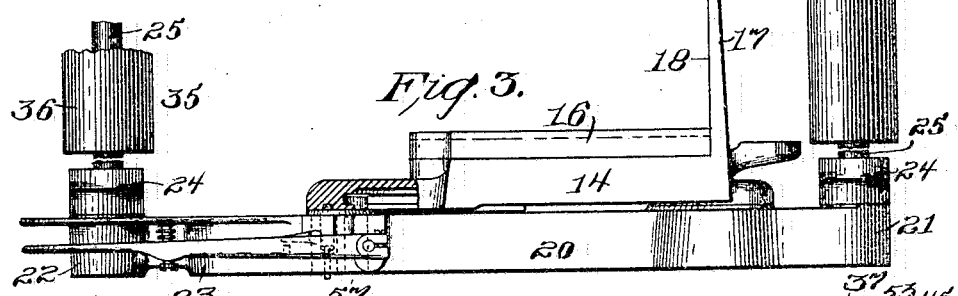
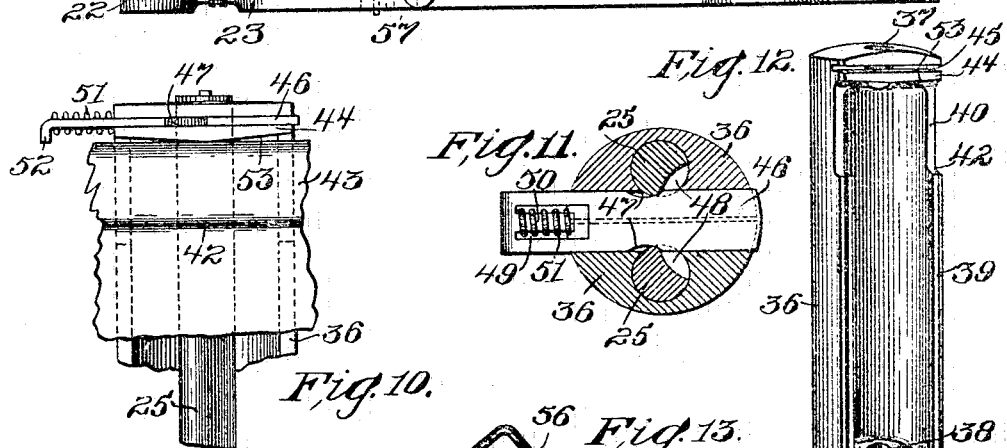

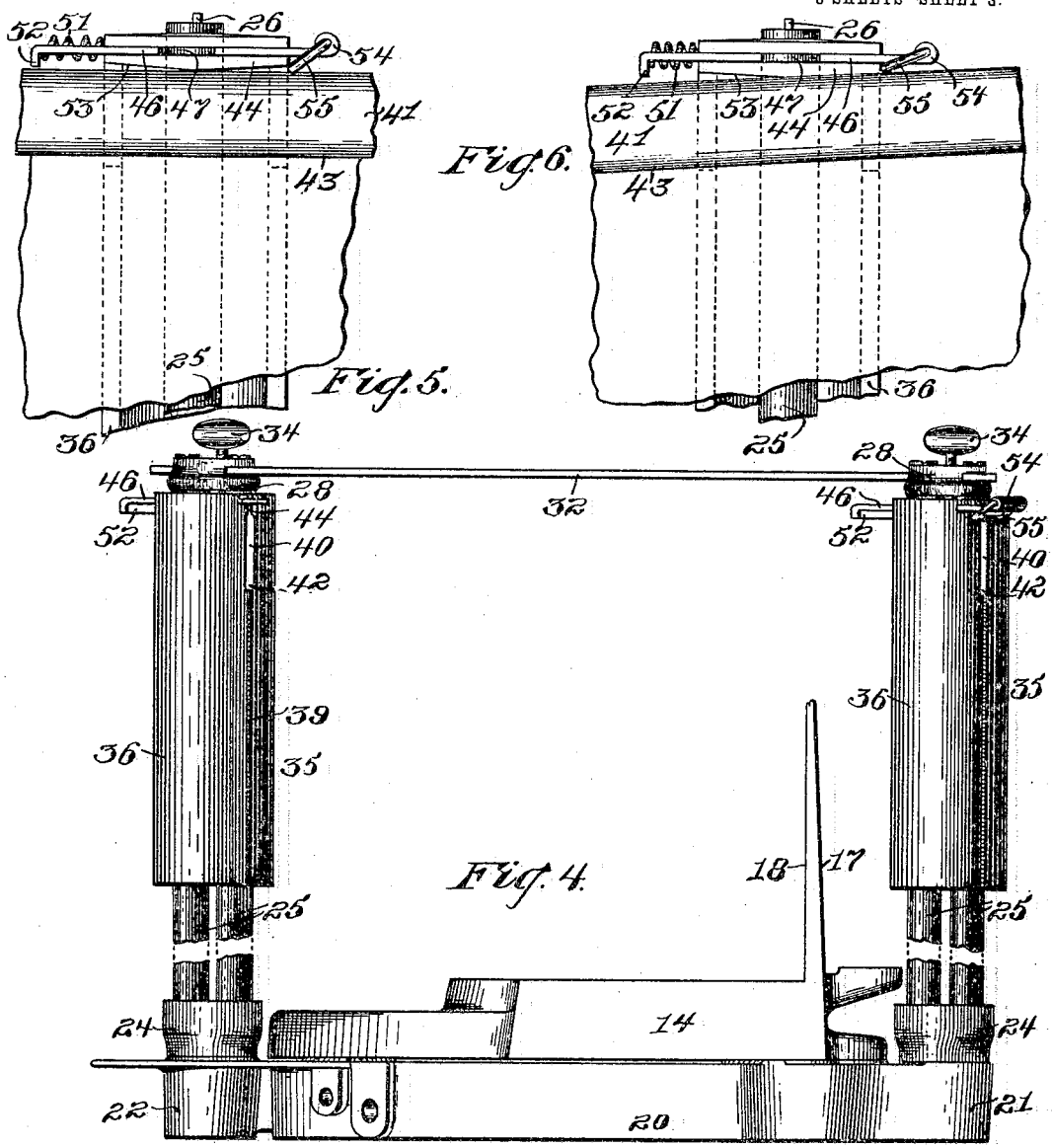

No. 766,384. Patented August 2, 1904.

UNITED STATES PATENT OFFICE.

FRANCIS H. RICHARDS, OF HARTFORD, CONNECTICUT, ASSIGNOR TO THE STANLEY RULE & LEVEL COMPANY, OF NEW BRITAIN, CONNECTICUT, A CORPORATION OF CONNECTICUT.

SAW-DETACHING MECHANISM.

SPECIFICATION forming part of Letters Patent No. 766,384, dated August 2, 1904.

Application filed October 2, 1903. Serial No. 175,423. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Saw-Detaching Mechanisms, of which the following is a specification.

This invention relates to and has for an object to provide means for suspending and releasing a saw.

In many wood-sawing devices, particularly miter-boxes as frequently constructed, there will be a guide for each end of a saw, which guides are organized to be suspended so as to suspend the saw above the work, and formerly when it was desired to release the saw to permit it to go to its working position it was necessary for the workman to detach one end, or the guide at one end, and then the other guide, thus requiring two manual operations. In the present improvement, however, it is necessary to manually release but one of the guides, which upon its release will permit the automatic release of the other guide, permitting the saw to assume its working position.

The means to manually release one guide may be placed in such position that the operator may actuate the same with a finger of the hand by which he is holding the saw-handle, and upon the release of the guide the saw will automatically release the other guide, thus giving the workman the free use of one hand to hold the work or some measuring instrument and not be compelled to use such hand to release the saw. When the workman is required by the law of the machine to take both hands off the saw, it is frequently at the cost of lack of precision of the position of the work or in loss of time in readjusting the same or the measuring-tools.

In the drawings accompanying and forming part of this specification my invention is illustrated as applied to a miter-box, and in which—

Figure 1 is an end view showing a saw and parts of the device in different positions. Fig. 2 is a top view. Fig. 3 is an end view, partly broken away. Fig. 4 is an enlarged end view looking at the device from the right-hand end of Fig. 2. Fig. 5 is a detail of the back saw-guide support and a portion of the saw in normal position. Fig. 6 is a similar view showing the saw tripping the catch or lock. Fig. 7 is a cross-section of the guide-cylinder, showing a top view of the rear catch. Fig. 8 is an enlarged view of a cap for the guide-rods. Fig. 9 is a perspective of the top end of one of the guide-rods. Fig. 10 is a view similar to Fig. 5, but of the front guide. Fig. 11 is a view similar to Fig. 7 of the front guide. Fig. 12 is a perspective view of one-half of the guide-cylinder, and Fig. 13 is a perspective view of the bail or detaching-lever of the rear clamp.

The miter-box as at present constituted is shown as comprising a body portion 14, supported by legs 15 and having a floor-board 16 upon it. A back member 17 rises from the frame and has a work-positioning face 18, which coöperates with the face of the board to properly locate the work. A saw passageway 19 goes through the back plate, permitting the saw to pass through the work There is shown swiveled to the frame in the region of the saw-opening a beam or swiveled guide-supporting frame 20, having at its back end a socket 21 to carry a guide and at its front end sockets 22 and 23 to exchangeably support a saw-guide. In the present instance each saw-guide is mounted upon a base-block 24, having a stem entering a socket, from which base-block a pair of rods 25 project, which rods may be securely fastened in the block and be provided at their upper ends with wings or ribs 26, and each is provided at such end with a tapped hole 27. The rods will be secured together by a cap (designated in a general way by 28) which has openings 29 to receive the wings 26 and has holes 30 to permit the passage of screws to enter the screw-holes 27, whereby the rods may be securely fastened together at their top ends. The caps are also provided with passage-ways 31, through which a tie-rod 32 may pass to afford mutual support between the front and rear guides, the cap being provided with a screw-threaded opening 33, in which a set-screw 34 will enter, the purposes of such setscrew being to permit the exchange of the front guide from the socket 22 to the socket 23, or the reverse, as desired, to accommodate different sizes of work and different positions of the arm. Upon each of the guide-rods is mounted one-half of a saw-guide cylinder 35, each half comprising a body portion 36, having an opening 37 at its top and an opening 38 at its bottom to travel upon the guide-rod and having a face 39 to guide the saw-blade and a portion cut away at 40 to permit the free passage of the back 41 of a backed saw and a face 42 to engage the lower face 43 of the back of a saw, the face 43 being the face of the back which is toward the teeth edge of the saw-blade.

Above the back opening is an extension or ledge 44 to rest upon the back of the saw when the saw is in use. Above such ledge is shown a channel 45, and when the halves of the cylinder are assembled the channel will receive a bolt 46 in the nature of a blade which is cut away at 47, so that it will freely pass between the saw-guide rods, they being cut away at 48 to receive such latch or bolt to hold the cylinder suspended, the end of the lock being provided with an opening 49 and which has a tongue 50, around which a coil-spring 51 may be placed to bear upon the side of the cylinder and hold the latch in a normally locked position, a bent-over portion 52 of the latch affording a surface whereby it may be engaged. When the cylinders are raised up, they will automatically catch and suspend the saw by the face 42 coming in contact with the face 43 and hold the saw out of the working position. The saw may be released by shifting the latches through the channels 45 and permitting the openings 47 to aline with the inside of the guide-rods, when the cylinder may be permitted to descend.

It will be observed that the ledge 44 has beveled faces 53 toward the front and the back to give the back of the saw some play within the guide, but moving upon a plane parallel with the plane of the faces 39. The back guide—that is, the guide at the back of the machine or at the end farthest from the workman's hand, here called the "back" guide because it is at the back of the machine, but the other guide, called the "front" guide, supports the rear end of the saw—may have an eye 54 bent in it, in which a bail or lever 55 is mounted and which bail will lie in the path of the movement of the back 41 of the saw when having a movement permitted by the bevel 53. The bail may be provided with upturned ends 56 to hold it from falling away from its active position. Upon the saw-back moving against such blade it will be caused to ride up the face of the guide-cylinder and will pull back the latch. In Fig. 1 the full-line position of the saw shows it in position suspended by the suspension of the saw-guides. The workman after bringing the saw to its exact position and securing it by means of a clamping device (designated in a general way by 57) will by means of the index-finger of the hand by which he holds the saw (designated in a general way by dotted lines 58) press in the front latch, thereby releasing such cylinder, when the saw will assume the position indicated by the dotted lines 59, which will bring the back of the saw against the bail and cause the same to ride up on the face of the cylinder and to draw the latch and hold it in its drawn position. In the position indicated by dotted lines 59 the front cylinder will bind upon the guide-rods and upon the back of the saw, when by raising the saw slightly the binding will be relieved and the saw will be permitted to assume the position indicated by dotted lines 60, when the sawing may proceed, and after the workman has finished the saw-cut he may raise the saw and it will automatically become fastened. Thus it will be seen that the saw-guide nearest the workman's hand and within reach of the index-finger of the hand by which he works the saw may be tripped, and upon such tripping the action of the saw will automatically release the back guide.

The truss-frame herein shown is claimed in my copending application, Serial No. 175,425, and the means for holding the saw-guide beam is claimed in my copending application, Serial No. 175,421, both filed October 2, 1903.

Having thus described my invention, I claim—

1. In a sawing-machine the combination with means to support the work, of means at each side of the work to support the saw, independent means to hold the supports in an inactive position, manually-actuated means to release one of said holding means, and saw-actuated means to release the other of said holding means upon the movement of the saw from its normal position.

2. In a sawing-machine, the combination with means to support the work, of means at each side of the work to guide the saw; independently-actuatable means to hold the respective guides in inactive positions; manually-actuated means to release one of such holding means; and means automatically actuated by the saw upon the release of said manually-actuated means to release the other of said holding means.

3. The combination with members having faces to guide the sides of a saw-blade, faces to engage the back of the saw on its edge toward the teeth of the saw, means to suspend such members and thereby the saw, manually-actuated means to release one of said members, and means controlled by the saw upon the release thereof to release the other of said members.

4. In a miter-box, the combination of a pair of saw-guides at the front and rear respectively of the box; means releasable by the index-finger of the workman to suspend the front guide; and means releasable by the inclination of the saw-back upon the falling of the front guide to suspend the rear guide.

5. The combination with a frame, of a pair of saw-supporting guides carried thereby, manually-released means to suspend one guide, and means released by the saw-back to suspend the other guide.

6. The combination of a pair of saw-guides each comprising a pair of parallel guide-bars, a plate carried by each bar and having a face to guide a saw-blade, and a face to support the edge of a saw-back; a catch for each guide, a protrusion on one of the catches for manual actuation, and means to actuate the other catch and comprising a bail carried thereby bearing on the plates and in the path of movement of the saw-back upon being tipped down at the handle end.

7. The combination of a pair of saw-guides each embodying faces to guide the sides of a saw-blade, a passage-way for the saw-back, faces to engage the edge of the back next the blade, a catch carried by one of the guides to suspend the same, a bail carried by the catch bearing on the guide and in the path of movement of the saw-back upon being turned.

8. In a miter-box the combination with a pair of saw-guides each comprising a pair of parallel guide-bars; a plate carried by each bar and having a face to guide the saw-blade and a face to support the edge of the saw-back; a notch in the bars; a spring-pressed catch to engage the same carried by the plates; a protrusion on one of the catches to actuate the same; and means to actuate the other catch comprising a bail carried thereby bearing on the plates and in the path of movement of the saw-back upon being tipped down at the handle end.

9. In a miter-box the combination with a frame, of a saw-guide support movable to position the saw at various angles across the frame; guide-cylinders; guide-rods therefor carried by the support; means to suspend the cylinders; faces on the cylinders to guide the saw-blade and faces to support the saw by its back when the cylinders are suspended; manually-controlled means to release one cylinder; and a bail to release the other cylinder and in the path of movement of the saw-back when it moves incident to its descent at the end controlled by the manually-released cylinder when so released.

10. A saw-guide comprising a split cylinder, the adjacent faces of the halves having saw-blade-guiding faces; a saw-back clearance; saw-back-supporting faces; a face to rest upon the saw-back and beveled to permit rotation of the saw-blade upon the plane of the guiding-faces; a bolt; means to throw the bolt; and a lever carried by the bolt and bearing on the cylinder and in the path of movement of the back when so rotated.

11. A saw-guide comprising a split cylinder, the adjacent faces of the halves having saw-blade-guiding faces; a saw-back clearance; saw-back-supporting faces; a face to rest upon the saw-back and beveled to permit rotation of the saw-blade upon the plane of the guiding-faces; a bolt; means to throw the bolt; a lever carried by the bolt and bearing on the cylinder and in the path of movement of the back when so rotated; and means to hold the lever in its working position.

12. A miter-box having guides to control a saw at two positions along its length; one of such guides comprising a pair of members each having a saw-blade-guiding face, a saw-back clearance, a saw-back-supporting face and a face to rest upon the saw-back, a bolt to suspend the guide and means to release the bolt; the other guide comprising a pair of members each having a saw-blade-guiding face, a saw-back clearance, a saw-back-supporting face, a face to rest upon the saw-back and beveled to permit rotation of the saw-blade upon the plane of the guiding-faces, a bolt, and a lever carried by the bolt and bearing upon said members and in the path of movement of the saw-back when so rotated.

13. A miter-box having a guide to control a saw at two positions along its length; one of such guides comprising a pair of saw-blade-guiding faces, a saw-back-supporting face and a face to rest upon the saw-back, and means to suspend the guide; the other guide comprising a pair of members having saw-blade-guiding faces; a saw-back-supporting face, a face to rest upon the saw-back and beveled to permit rotation of the saw-blade upon the plane of the guiding-faces, a bolt, a lever carried by the bolt and bearing upon said guide and in the path of movement of the saw-back when so rotated.

14. In a sawing-machine, the combination with means to hold the work, of means to guide the saw upon a determined plane but permitting its rotation on such plane; means to suspend the guide; and means actuated by the saw in such rotation to release the suspending means.

Signed at Nos. 9 to 15 Murray street, New York, N. Y., this 19th day of September, 1903.

FRANCIS H. RICHARDS.

Witnesses:
 CHAS. LYON RUSSELL,
 FRED. J. DOLE.